United States Patent
Katsuyama et al.

(10) Patent No.: US 9,527,510 B2
(45) Date of Patent: Dec. 27, 2016

(54) DRIVING FORCE CONTROL APPARATUS FOR A FOUR-WHEEL DRIVE VEHICLE

(71) Applicant: TOYOTA JIDOSHA KABUSHIKI KAISHA, Toyota-shi, Aichi-ken (JP)

(72) Inventors: Etsuo Katsuyama, Hiratsuka (JP); Takao Kobayashi, Nagakute (JP); Hideki Sugiura, Nagakute (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/143,740

(22) Filed: May 2, 2016

(65) Prior Publication Data
US 2016/0332626 A1 Nov. 17, 2016

(30) Foreign Application Priority Data
May 13, 2015 (JP) ................................. 2015-097996

(51) Int. Cl.
*B60W 10/04* (2006.01)
*B60W 10/119* (2012.01)
*B60W 30/18* (2012.01)

(52) U.S. Cl.
CPC .............. *B60W 30/18* (2013.01); *B60W 10/04* (2013.01)

(58) Field of Classification Search
None
See application file for complete search history.

(56) References Cited

U.S. PATENT DOCUMENTS

2002/0109402 A1  8/2002  Nakamura
2009/0187324 A1* 7/2009  Lu .......................... B60K 31/00
                                                          701/94

(Continued)

FOREIGN PATENT DOCUMENTS

JP   09-086367 A    3/1997
JP   2002-211378 A  7/2002

(Continued)

OTHER PUBLICATIONS

Takao Kobayashi et al., "Study on Driving Force Distribution and Power Consumption in Cornering", Proceedings of Society of Automotive Engineers of Japan, 2013, 13 pages.

(Continued)

*Primary Examiner* — Edwin A Young
(74) *Attorney, Agent, or Firm* — Sughrue Mion, PLLC

(57) ABSTRACT

Provided is a driving force control apparatus (10) configured to control driving forces applied to four wheels by controlling a driving force application apparatus (in-wheel motors (16FL to 16RR) and friction braking apparatus (24)) configured to apply driving forces to front left and right wheels (12FL and 12FR) and rear left and right wheels (12RL and 12RR) independently. The driving force control apparatus (10) is configured to: calculate vehicle body speeds $V_j$ at positions of the four wheels, vertical loads $Fz_j$ of the four wheels, and a driving force Fx required by a driver (S30 to S50); calculate, based on those values, target driving forces $F_{xj}$ for the four wheels to set tire sliding vectors of the four wheels to be the same (S60); and control the driving force application apparatus such that the driving forces of the four wheels are equal to corresponding target driving forces, respectively (S70).

3 Claims, 2 Drawing Sheets

(56) References Cited

U.S. PATENT DOCUMENTS

| | | | |
|---|---|---|---|
| 2012/0179349 A1* | 7/2012 | Yamakado | B60T 8/1755 701/89 |
| 2013/0184947 A1* | 7/2013 | Nozu | B60W 10/119 701/54 |

FOREIGN PATENT DOCUMENTS

| | | |
|---|---|---|
| JP | 2006-192946 A | 7/2006 |
| JP | 2008-179365 A | 8/2008 |
| JP | 2011-188561 A | 9/2011 |

OTHER PUBLICATIONS

Shinzo Kodama et al., "Matrix Theory for System Control", The Society of Instrument and Control Engineers as necessary for the pseudoinverse, 2002, pp. 325-347.

* cited by examiner

DRIVING FORCE CONTROL APPARATUS FOR A FOUR-WHEEL DRIVE VEHICLE

BACKGROUND OF THE INVENTION

1. Field of the Invention

The present invention relates to a driving force control apparatus configured to control driving forces to be applied to front left and right wheels and rear left and right wheels of a four-wheel drive vehicle.

2. Description of the Related Art

In an electric vehicle such as an electric automobile, left and right drive wheels are driven by respective electric motors or a common electric motor. The driving forces of the left and right drive wheels are controlled, so as to that the sum of those driving forces is equal to a driving force required by a driver, to take the same value, or to take values different from one another by optionally, independently controlling outputs of respective electric motors.

Respective drive wheels are in contact with a road surface through tires, and the driving force is transmitted to the road surface via the tires, with the result that energy is consumed by the tire treads of the respective wheels. Thus, it is possible to extend the cruising distance of the electric vehicle per battery charge by reducing the energy consumed by the tire treads of the respective drive wheels.

For example, in Japanese Patent Application Laid-open No. 2011-188561, there is disclosed an electric vehicle configured to control the driving forces of the left and right drive wheels such that a yaw moment produced by a difference between the driving forces of the left and right drive wheels takes an optimal value for a steady state circular turning of the vehicle determined by a steering angle. With the electric vehicle disclosed in Japanese Patent Application Laid-open No. 2011-188561, cornering resistances of the left and right drive wheels can be reduced, thereby being capable of reducing energy consumed when the tires of respective drive wheels slide in a lateral direction on the treads.

In the electric vehicle disclosed in Japanese Patent Application Laid-open No. 2011-188561, consideration is not given to a case where the tires of respective drive wheels slide in a longitudinal direction on the treads and a case where lateral forces of the tires change due to a load shift in the longitudinal direction caused when the vehicle accelerates or decelerates. Thus, it is only possible to reduce the energy that is consumed due to a lateral slide of the tires of respective drive wheels on the treads caused when the vehicle makes a turn at a constant vehicle speed. In other words, it is not possible to reduce energy that is consumed due to a longitudinal slide of the tires of respective drive wheels on the treads caused as in the case of the vehicle making a turn with acceleration or deceleration.

Further, in the electric vehicle disclosed in Japanese Patent Application Laid-open No. 2011-188561, consideration is not given to optimization of the driving forces of unsteered wheels. Thus, in the four-wheel drive vehicle in which driving forces are applied to the front left and right wheels and the rear left and right wheels, it is not possible to optimally control the driving forces of the four wheels so as to reduce energy consumed when the tires of respective drive wheels slide on the treads.

SUMMARY OF THE INVENTION

It is a primary object of the present invention to control, in a four-wheel drive vehicle in which driving forces are applied to front left and right wheels and rear left and right wheels independently of one another, the driving forces of the four wheels to achieve the smallest sum of energy consumed when the tires of the four wheels slide on the treads.

According to one embodiment of the present invention, there is provided a driving force control apparatus, which is to be applied to a four-wheel drive vehicle including front left and right wheels and rear left and right wheels each having a tire and including a driving force application apparatus configured to apply driving forces to the four wheels independently of one another, and which is configured to control the driving forces to be applied to the four wheels by controlling the driving force application apparatus.

The driving force control apparatus includes: an apparatus configured to acquire information on vehicle body speeds at positions of the four wheels; an apparatus configured to acquire information on vertical loads of the four wheels; and an apparatus configured to acquire information on a driving force required by a driver to the four-wheel drive vehicle, and the driving force control apparatus is configured to calculate target driving forces for the four wheels required to set tire sliding vectors of the four wheels to be the same as one another based on the vehicle body speeds at the positions of the four wheels, the vertical loads of the four wheels, and the required driving force, and to control the driving force application apparatus such that the driving forces of the four wheels are equal to the corresponding target driving forces, respectively.

The energy consumed by the tire treads of the front left and right wheels and the rear left and right wheels is represented as a value obtained by adding inner products of tire force vectors and sliding velocity vectors of four wheels, the tire force vectors containing tire forces both in an adhesion area and a sliding area. As described later in detail, when the tire sliding vectors of the four wheels are set to be the same as one another, that is, when the magnitude and direction of the tire sliding vectors of the four wheels are set to be the same as one another, the sum of energy consumed by the tire treads of the four wheels is minimized irrespective of the magnitude and direction of the tire sliding vectors.

In the configuration described above, the target driving forces for the four wheels required to set the tire sliding vectors of the four wheels to be the same as one another are calculated based on the vehicle body speeds at the positions of the four wheels, the vertical loads of the four wheels, and the required driving force. Further, the driving force application apparatus is controlled such that the driving forces of the four wheels are equal to the corresponding target driving forces, respectively. Thus, the driving forces of the four wheels can be controlled such that the tire sliding vectors of the four wheels are set to be the same as one another and the sum of energy consumed by the tire treads of the front left and right wheels and the rear left and right wheels is minimized irrespective of the magnitude and direction of the tire sliding vectors.

In the one embodiment of the present invention, the driving force control apparatus is configured to calculate the target driving forces for the four wheels by distributing the required driving force to the four wheels such that each of the target driving forces for the four wheels is proportional to a "ratio of a vertical load of a corresponding wheel to a vehicle body speed at a position of the corresponding wheel" and a sum of the target driving forces for the four wheels is equal to the required driving force.

In the configuration described above, the target driving forces for the four wheels are calculated by distributing the driving force required by the driver to the four wheels such that the target driving forces for the four wheels are proportional to the ratios of the vertical loads of the four wheels to the vehicle body speeds at the positions of the four wheels, respectively, and the sum of the target driving forces for the four wheels is equal to the required driving force. Thus, as described in detail later, it is possible to calculate the target driving forces for the four wheels that can set the tire sliding vectors of the four wheels to be the same as one another not only when the vehicle is traveling straight ahead at a constant speed and when the vehicle is making a turn steadily, but also when the vehicle is traveling with acceleration or deceleration.

In the one embodiment of the present invention, the driving force control apparatus is configured to calculate the target driving forces $F_{x1}$, $F_{x2}$, $F_{x3}$, and $F_{x4}$ for the front left and right wheels and the rear left and right wheels in accordance with the following expression:

$$\begin{bmatrix} F_{x1} \\ F_{x2} \\ F_{x3} \\ F_{x4} \end{bmatrix} = \frac{1}{\sum_{j=1}^{4} \frac{F_{zj}}{V_j}} \begin{bmatrix} \frac{F_{z1}}{V_1} \\ \frac{F_{z2}}{V_2} \\ \frac{F_{z3}}{V_3} \\ \frac{F_{z4}}{V_4} \end{bmatrix} F_x$$

where $V_1$ to $V_4$ represent the vehicle body speeds at the positions of the front left and right wheels and the rear left and right wheels, respectively, $F_{z1}$ to $F_{z4}$ represent the vertical loads of the front left and right wheels and the rear left and right wheels, respectively, and Fx represents the required driving force.

In the configuration described above, the target driving forces $F_{x1}$, $F_{x2}$, $F_{x3}$, and $F_{x4}$ for the front left and right wheels and the rear left and right wheels are calculated in accordance with the above expression. Thus, as described in detail later, it is possible to calculate the target driving forces for the four wheels required to set the tire sliding vectors for the four wheels to be the same as one another even under a situation in which the difference in wheel speed is large between the left and right wheels due to a small turning radius of the vehicle. Therefore, it is possible to minimize the sum of energy consumed by the tire treads of the four wheels irrespective of the traveling condition of the vehicle.

Note that, in the present application, the "driving force" and the "target driving force" are not limited to positive values with the value of a direction of accelerating the vehicle being positive, namely, the driving force in a narrow sense, but include negative values, namely, the braking force for decelerating the vehicle.

DETAILED DESCRIPTION OF THE PREFERRED EMBODIMENTS

Now, a preferred embodiment of the present invention is described in detail with reference to the accompanying drawings.

Figure 1:
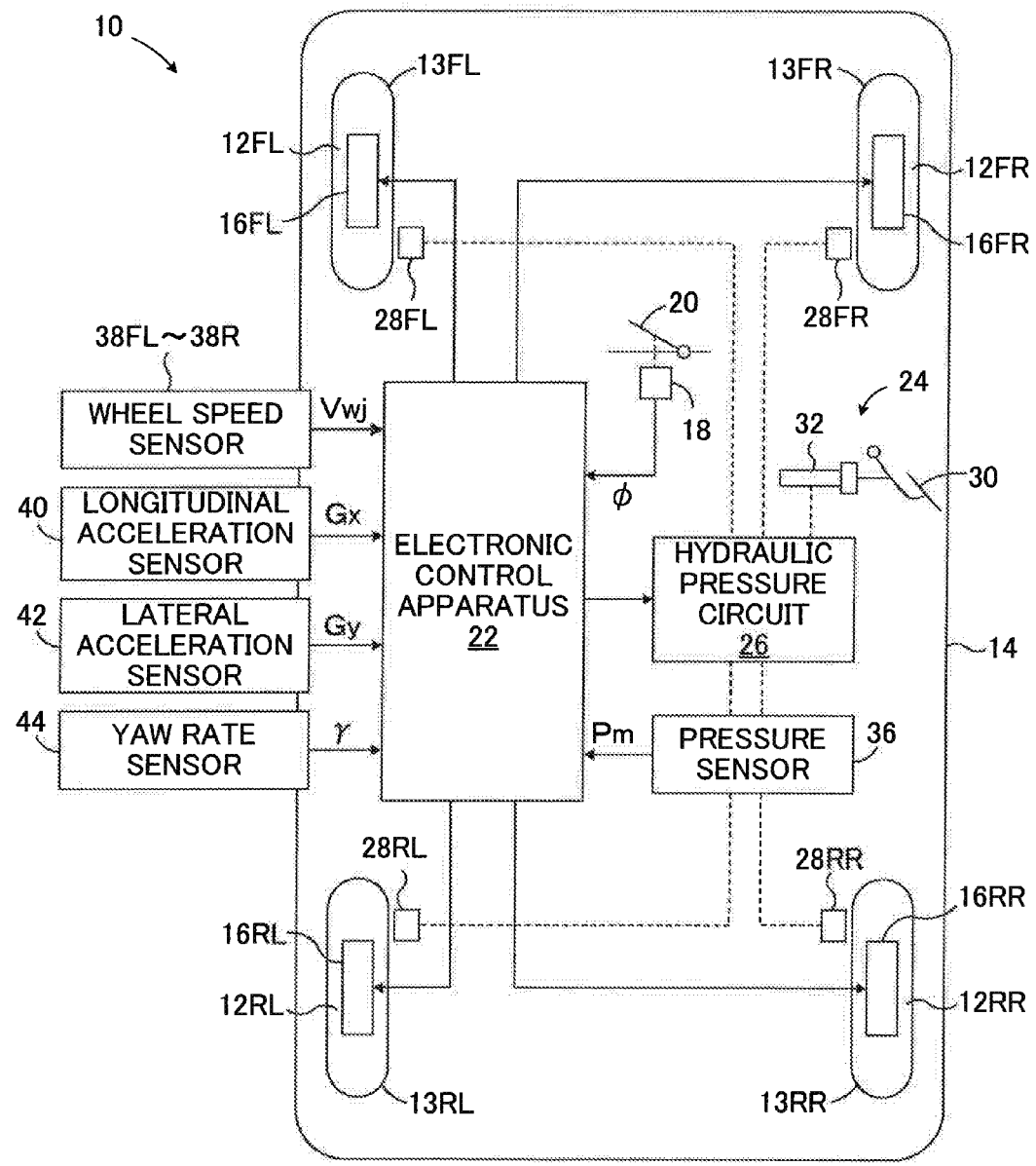
FIG. 1 is a schematic configuration diagram for illustrating a driving force control apparatus for a vehicle applied to a four-wheel drive vehicle having in-wheel motors according to an embodiment of the present invention.

FIG. 1 is a schematic configuration diagram for illustrating a driving force control apparatus 10 for a vehicle applied to a four-wheel drive vehicle having in-wheel motors according to an embodiment of the present invention.

As illustrated in FIG. 1, the driving force control apparatus 10 is applied to a vehicle 14 having front left and right wheels 12FL and 12FR, which are steered wheels, and rear left and right wheels 12RL and 12RR, which are unsteered wheels. Although not illustrated in detail in FIG. 1, the front wheels 12FL and 12FR have tires 13FL and 13FR, which are mounted to metal wheels, respectively, and the rear wheels 12RL and 12RR have tires 13RL and 13RR, which are mounted to metal wheels, respectively.

The front wheels 12FL and 12FR are driven by being applied with driving forces independently of each other by in-wheel motors 16FL and 16FR built into corresponding respective wheels. Similarly, the rear left and right wheels 12RL and 12RR are driven by being applied with driving forces independently of each other by in-wheel motors 16RL and 16RR built into corresponding respective wheels. Each of the in-wheel motors 16FL to 16RR also functions as a regenerative motor when braking is applied, to generate a regenerative braking force.

The driving forces of the in-wheel motors 16FL to 16RR are controlled by a driving force control unit of an electronic control apparatus 22 based on an accelerator opening φ, which is a depressed amount of an accelerator pedal 20 detected by an accelerator opening sensor 18. The regenerative braking forces of the in-wheel motors 16FL to 16RR are controlled by a braking force control unit of the electronic control apparatus 22 via the driving force control unit.

During normal traveling of the vehicle 14, electric power charged in a battery that is not illustrated in FIG. 1 is supplied to the in-wheel motors 16FL to 16RR via a drive circuit. During braking of the vehicle 14, electric power generated through regenerative braking by the in-wheel motors 16FL to 16RR is charged in the battery via the drive circuit.

Friction braking forces are applied to the front wheels 12FL and 12FR and the rear wheels 12RL and 12RR independently of one another by a friction braking apparatus 24. The friction braking forces of the front wheels 12FL and 12FR and the rear wheels 12RL and 12RR are controlled by braking pressures of corresponding wheel cylinders 28FL, 28FR, 28RL, and 28RR being controlled by a hydraulic pressure circuit 26 of the friction braking apparatus 24. Although not illustrated in FIG. 1, the hydraulic pressure circuit 26 includes a reservoir, an oil pump, various valve apparatus, and the like.

The braking pressures of respective wheel cylinders are usually controlled based on a pressure within a master cylinder 32 (hereinafter referred to as "master cylinder pressure"), which is driven in response to depression of a brake pedal 30 by a driver. Further, irrespective of the depression amount of the brake pedal 30 by the driver, the braking pressures of respective wheel cylinders are controlled by the oil pump and various valve apparatus being controlled by the braking force control unit of the electronic control apparatus 22 as necessary.

As can be understood from the above description, the in-wheel motors 16FL to 16RR apply driving forces in a narrow sense (positive driving forces) to the front wheels 12FL and 12FR and the rear wheels 12RL and 12RR, respectively, whereas the friction braking apparatus 24 applies the braking forces (negative driving forces) to the front wheels 12FL and 12FR and the rear wheels 12RL and 12RR. Thus, the in-wheel motors 16FL to 16RR and the friction braking apparatus 24 cooperatively function as a driving force application apparatus configured to apply driving forces to the front wheels 12FL and 12FR and the rear wheels 12RL and 12RR independently of one another.

Although not illustrated in FIG. 1, the electronic control apparatus 22 includes, in addition to the driving force control unit and the braking force control unit, an integral control unit configured to control those control units. Respective control units are configured to transmit or receive a signal to/from one another as necessary. As described later in detail, the integral control unit controls the driving forces of the four wheels by controlling the in-wheel motors 16FL to 16RR and the friction braking apparatus 24 such that the driving force of the vehicle is equal to the driving force required by the driver and at the same time the sum of energy consumed on the treads of the four wheels is the minimum.

Note that, although not illustrated in detail in FIG. 1, the control units of the electronic control apparatus 22 each include a microcomputer and a drive circuit. Each microcomputer is generally configured to include a CPU, a ROM, a RAM, and an input and output port device, those components being connected to one another via a bilateral common bus.

In addition to a signal indicating the accelerator opening φ from the accelerator opening sensor 18, a signal indicating a master cylinder pressure Pm is input to the electronic control apparatus 22 from a pressure sensor 36 and signals indicating wheel speeds Vwfl, Vwfr, Vwrl, and Vwrr of wheels corresponding to wheel speed sensors 38FL to 38RR are input to the electronic control apparatus 22 from the wheel speed sensors 38FL to 38RR. Further, signals indicating a longitudinal acceleration Gx and a lateral acceleration Gy of the vehicle 14 are input to the electronic control apparatus 22 from a longitudinal acceleration sensor 40 and a lateral acceleration sensor 42, respectively, and a signal indicating a yaw rate γ of the vehicle 14 is input to the electronic control apparatus 22 from a yaw rate sensor 44. Note that, the lateral acceleration sensor 42 and the yaw rate sensor 44 are configured to detect the lateral acceleration Gy and the yaw rate γ with the values thereof being positive when the vehicle turns left, respectively.

Next, a description is given of an outline of controlling the driving forces of the wheels 12FL to 12RR to be executed by the integral control unit of the electronic control apparatus 22 in the embodiment.

It is generally known that mechanical power for driving wheels is represented as an inner product of a tire force and a sliding velocity without distinguishing between the lateral force and the longitudinal force. Thus, as represented by Expression (1), a sum J of energy consumed by the tire treads of the wheels 12FL to 12RR is represented as a value obtained by adding inner products of tire force vectors $F_{vj}$ and sliding velocity vectors $V_{vj}$ of four wheels, the tire force vectors containing tire forces both in an adhesion area and a sliding area. Note that, reference should be made to Takao Kobayashi et al., 2013, "Study on Driving Force Distribution and Power Consumption in Cornering", Proceedings of Society of Automotive Engineers of Japan as necessary for the representation of the mechanical power for driving wheels as an inner product of the tire force and the sliding velocity.

$$J = -\sum_{j=1}^{4} F_{vj} \cdot V_{vj} \quad (1)$$

As described later in detail, the sum J of energy consumed by the tire treads of the four wheels can be minimized irrespective of the magnitude and direction of the tire sliding vectors when the tire sliding velocity vectors $V_{vj}$ of the four wheels are set to be the same as one another.

The driving forces $F_{xj}(=[F_{x1}\ F_{x2}\ F_{x3}\ F_{x4}]^T)$ of the four wheels required to set the tire sliding velocity vectors $V_{vj}$ of the four wheels to be the same as one another are represented by Expression (2). In addition to when the vehicle is traveling straight ahead at a constant speed and when the vehicle is making a turn steadily, Expression (2) is satisfied also when the vehicle is traveling with acceleration or deceleration, and still also when the difference in wheel speed is large between the left and right wheels due to a small turning radius. Thus, through setting of the target driving forces for the four wheels as the driving forces $F_{xj}$ calculated by Expression (2), it is possible to minimize the sum J of energy consumed by the tire treads of the four wheels by controlling the driving forces of the four wheels to be equal to the corresponding target driving forces, respectively.

$$F_{xj} = \frac{1}{\sum_{j=1}^{4} \frac{F_{zj}}{V_j}} \begin{bmatrix} \frac{F_{z1}}{V_1} \\ \frac{F_{z2}}{V_2} \\ \frac{F_{z3}}{V_3} \\ \frac{F_{z4}}{V_4} \end{bmatrix} F_x \quad (2)$$

Note that, in Expression (2), Fx represents the driving force required by the driver, $F_{z1}$ to $F_{z4}$ represent vertical loads of the wheels 12FL to 12RR, respectively, and $V_1$ to $V_4$ represent vehicle body speeds at the positions of the wheels 12FL to 12RR, respectively.

With Expression (2), the target driving forces $F_{x1}$ to $F_{x4}$ for the four wheels are calculated such that each of the target driving forces $F_{x1}$ to $F_{x4}$ of the four wheels is proportional to a "ratio of the vertical load $F_{zj}$ for the corresponding wheel to the vehicle body speed $V_j$ at the position of the corresponding wheel" and the sum of the target driving forces $F_{x1}$ to $F_{x4}$ for the four wheels is equal to the required driving force Fx.

Next, a description is given of minimizing the sum J of consumed energy by setting the tire sliding velocity vectors $V_{vj}$ of the four wheels to be the same as one another.

The sum of energy consumed by the tire treads of the four wheels is represented by an evaluation function J of Expression (3) corresponding to Expression (1). A longitudinal force $F_x$ and a lateral force $F_y$ of the vehicle are sums of the longitudinal forces and the lateral forces of the four wheels, respectively, and thus Expression (4) and Expression (5) are constraint conditions. Note that, $s_j$ represents a slip ratio of the wheel, $\alpha_j$ represents a slip angle of the wheel, and a subscript j represents the front left wheel, the front right wheel, the rear left wheel, and the rear right wheel with 1 to 4, respectively. $K_{xj}$ represents a coefficient for converting the slip ratio $s_j$ of the wheel into the longitudinal force of the wheel, and $K_{yj}$ represents a coefficient for converting the slip angle $\alpha_j$ of the wheel into the lateral force of the wheel.

$$J = -\sum_{j=1}^{4} F_{vj} \cdot V_{vj} \qquad (3)$$
$$= (K_{x1}s_1^2 + K_{y1}\alpha_1^2)V_1 + (K_{x2}s_2^2 + K_{y2}\alpha_2^2)V_2 +$$
$$(K_{x3}s_3^2 + K_{y2}\alpha_3^2)V_3 + (K_{x4}s_4^2 + K_{y4}\alpha_4^2)V_4$$

$$K_{x1}s_1 + K_{x2}s_2 + K_{x3}s_3 + K_{x4}s_4 = F_x \qquad (4)$$

$$-K_{y1}\alpha_1 - K_{y2}\alpha_2 - K_{y3}\alpha_3 - K_{y4}\alpha_4 = F_y \qquad (5)$$

Now, consideration is given to minimizing the evaluation function J of Expression (3). For the sake of simplicity, the inertia of the vehicle 14 is assumed to be sufficiently larger than the normal travel resistance, and an influence of the travel resistance on the longitudinal acceleration of the vehicle 14 is ignored. At this stage, in order to obtain a minimum norm solution utilizing a Moore-Penrose pseudo-inverse, a vector $q_v$ as defined in Expression (6) for sliding states of the tires is subjected to variable transformation of Expression (7).

$$q_v = (s_1 \; s_2 \; s_3 \; s_4 \; \alpha_1 \; \alpha_2 \; \alpha_3 \; \alpha_4)^T \qquad (6)$$

$$p_v = \mathrm{diag}(\sqrt{K_{x1}V_1} \; \sqrt{K_{x2}V_2} \; \sqrt{K_{x3}V_3} \; \sqrt{K_{x4}V_4} \qquad (7)$$
$$\sqrt{K_{y1}V_1} \; \sqrt{K_{y2}V_2} \; \sqrt{K_{y3}V_3} \; \sqrt{K_{y4}V_4}) \cdot q_v$$

With Expressions (6) and (7), the constraint conditions of Expressions (4) and (5) can be redefined as represented by Expression (8), and the evaluation function J of Expression (3) to be optimized can be redefined as represented by Expression (9).

$$\left( \begin{array}{cccccccc} \sqrt{\frac{K_{x1}}{V_1}} & \sqrt{\frac{K_{x2}}{V_2}} & \sqrt{\frac{K_{x3}}{V_3}} & \sqrt{\frac{K_{x4}}{V_4}} & 0 & 0 & 0 & 0 \\ 0 & 0 & 0 & 0 & -\sqrt{\frac{K_{y1}}{V_1}} & -\sqrt{\frac{K_{y2}}{V_2}} & -\sqrt{\frac{K_{y3}}{V_3}} & -\sqrt{\frac{K_{y4}}{V_4}} \end{array} \right) \cdot p_v = \left( \begin{array}{c} F_x \\ F_y \end{array} \right) \qquad (8)$$

$$J = \|p_v\|^2 \qquad (9)$$

A vector $p_v$ minimizing the evaluation function J of Expression (9) while satisfying the constraint condition of Expression (8) is represented by Expression (10).

$$p_v = \left( \begin{array}{cccccccc} \sqrt{\frac{K_{x1}}{V_1}} & \sqrt{\frac{K_{x2}}{V_2}} & \sqrt{\frac{K_{x3}}{V_3}} & \sqrt{\frac{K_{x4}}{V_4}} & 0 & 0 & 0 & 0 \\ 0 & 0 & 0 & 0 & -\sqrt{\frac{K_{y1}}{V_1}} & -\sqrt{\frac{K_{y2}}{V_2}} & -\sqrt{\frac{K_{y3}}{V_3}} & -\sqrt{\frac{K_{y4}}{V_4}} \end{array} \right)^+ \cdot \left( \begin{array}{c} F_x \\ F_y \end{array} \right) \qquad (10)$$

In Expression (10), the suffix + of the coefficient matrix on the right side indicates that the matrix is a pseudoinverse. The vector $q_v$ minimizing the evaluation function J of Expression (9) is represented by Expression (11) in the final form. Note that, reference should be made to Shinzo Kodama and Nobuhide Suda, 2002, "Matrix Theory for System Control", page 325 to page 347 published by The Society of Instrument and Control Engineers as necessary for the pseudoinverse.

$$q_v = \mathrm{diag}\left( \frac{1}{\sqrt{K_{x1}V_1}} \; \frac{1}{\sqrt{K_{x2}V_2}} \; \frac{1}{\sqrt{K_{x3}V_3}} \; \frac{1}{\sqrt{K_{x4}V_4}} \; \cdots \; \frac{1}{\sqrt{K_{y1}V_1}} \; \frac{1}{\sqrt{K_{y2}V_2}} \; \frac{1}{\sqrt{K_{y3}V_3}} \; \frac{1}{\sqrt{K_{y4}V_4}} \right). \qquad (11)$$

-continued $$\left( \begin{matrix} \sqrt{\frac{K_{x1}}{V_1}} & \sqrt{\frac{K_{x2}}{V_2}} & \sqrt{\frac{K_{x3}}{V_3}} & \sqrt{\frac{K_{x4}}{V_4}} & 0 & 0 & 0 & 0 \\ 0 & 0 & 0 & 0 & -\sqrt{\frac{K_{y1}}{V_1}} & -\sqrt{\frac{K_{y2}}{V_2}} & -\sqrt{\frac{K_{y3}}{V_3}} & -\sqrt{\frac{K_{y4}}{V_4}} \end{matrix} \right)^+ \cdot \begin{pmatrix} F_x \\ F_y \end{pmatrix}$$

From the above, the vector $q_v$ of Expression (6) is represented by Expression (12).

$$q_v = (s_1 \ s_2 \ s_3 \ s_4 \ \alpha_1 \ \alpha_2 \ \alpha_3 \ \alpha_4)^T \quad (12)$$
$$= \left( \frac{d^{-1}F_x}{V_1} \ \frac{d^{-1}F_x}{V_2} \ \frac{d^{-1}F_x}{V_3} \ \frac{d^{-1}F_x}{V_4} \right.$$
$$\left. -\frac{a^{-1}F_y}{V_1} \ -\frac{a^{-1}F_y}{V_2} \ -\frac{a^{-1}F_y}{V_3} \ -\frac{a^{-1}F_y}{V_4} \right)$$

The parameters d and a in Expression (12) are represented by Expressions (13) and (14), respectively. Note that, $C_x$ represents a coefficient for converting the vertical loads $F_{z1}$ to $F_{z4}$ of the wheels to the coefficients $K_{xj}$, and $C_y$ represents a coefficient for converting the vertical loads $F_{z1}$ to $F_{z4}$ of the wheels to the coefficients $K_{yj}$.

$$d = \sum_{j=1}^{4} \frac{K_{xj}}{V_j} = \left( \sum_{j=1}^{4} \frac{F_{zj}}{V_j} \right) C_x \quad (13)$$

$$a = \sum_{j=1}^{4} \frac{K_{yj}}{V_j} = \left( \sum_{j=1}^{4} \frac{F_{zj}}{V_j} \right) C_y \quad (14)$$

From Expression (12), the slip ratio $s_j$ and the slip angle $\alpha_j$ of each wheel exhibiting the optimal tire sliding state are represented by Expression (15).

$$\begin{pmatrix} s_j \\ \alpha_j \end{pmatrix} = \begin{pmatrix} \frac{F_x}{dV_j} \\ -\frac{F_y}{aV_j} \end{pmatrix} \quad (15)$$

From Expression (15), it can be understood that the slip ratio $s_j$ and the slip angle $\alpha_j$ that cause the tire sliding state of each wheel to be in the optimal state depend on the vehicle body speed $V_j$ at the position of each wheel. Through multiplication of the slip rate $s_j$ and the slip angle $\alpha_j$ of Expression (15) by the vehicle body speed $V_j$, it is possible to transform Expression (15) into Expression (16).

$$V_{vj} = \begin{pmatrix} V_j s_j \\ V_j \alpha_j \end{pmatrix} = \begin{pmatrix} \frac{F_x}{d} \\ -\frac{F_y}{a} \end{pmatrix} \quad (16)$$

The matrix on the left side of Expression (16) is a sliding velocity vector containing a longitudinal sliding velocity and a lateral sliding velocity. The value of the matrix on the right side of Expression (16) is the same value for all the wheels. Thus, it is understood that it is enough to set the sliding velocity vectors of the four wheels to be the same as one another in order to minimize the sum of energy consumed by the tire treads of the four wheels.

Figure 2:
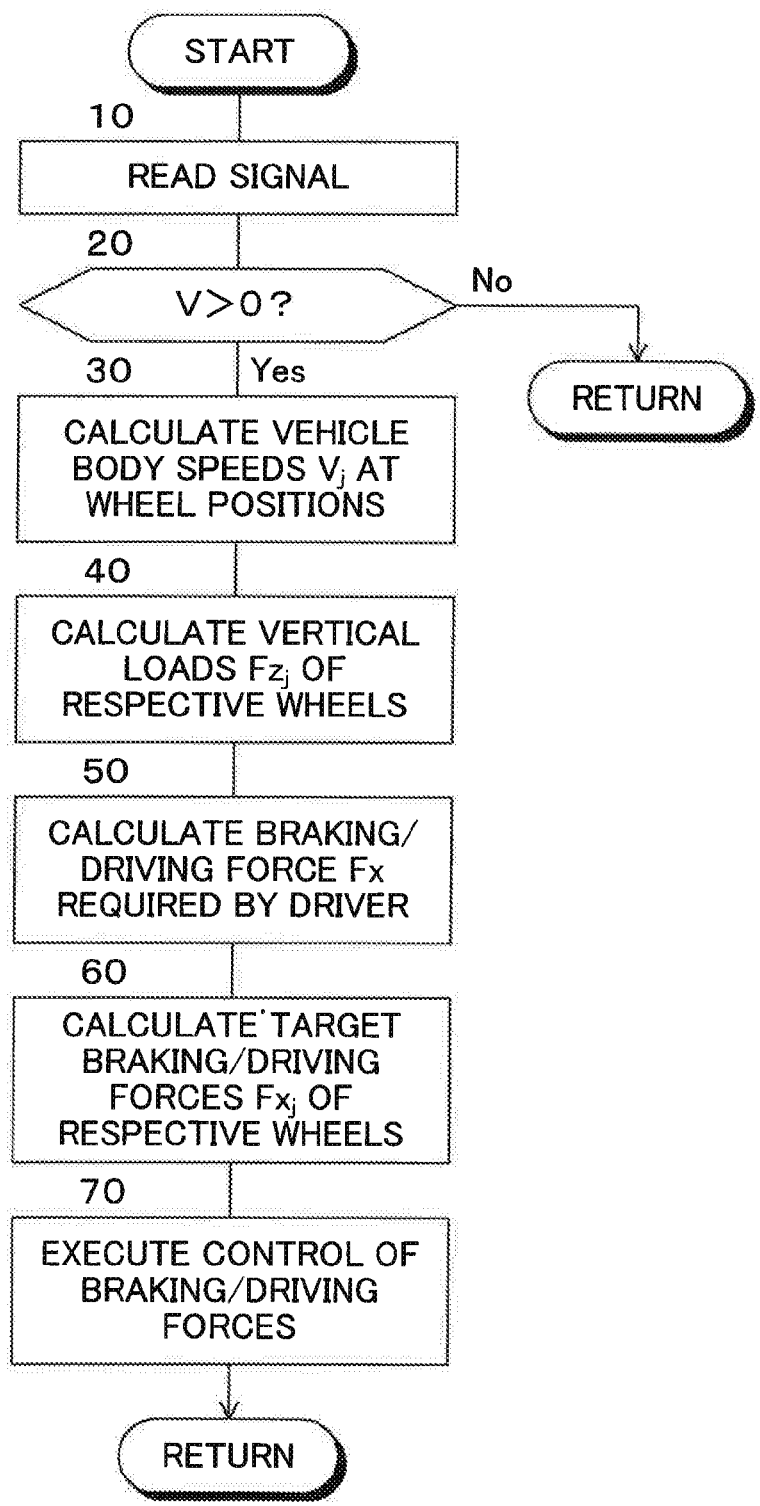
FIG. 2 is a flowchart for illustrating a control routine of driving forces of wheels according to the embodiment.

Next, a description is given of control of the driving forces of the wheels in the embodiment with reference to a flowchart illustrated in FIG. 2. The control based on the flowchart illustrated in FIG. 2 is repeatedly executed at predetermined time intervals when an ignition switch (not shown) is on. Note that, in the following description, the control of the driving forces of the wheels based on the flowchart illustrated in FIG. 2 is referred to simply as "control".

First, in Step 10, a signal indicating the accelerator opening φ from the accelerator opening sensor 18 and the like are read.

In Step 20, a vehicle body speed V at a position of the center of gravity of the vehicle 14 is calculated based on the wheel speeds Vwfl, Vwfr, Vwrl, and Vwrr of the four wheels, and at the same time, it is determined whether or not the vehicle body speed V is positive, that is, whether or not the vehicle 14 is traveling. When it is determined that the vehicle body speed V is not positive, the control is temporarily ended, whereas when it is determined that the vehicle body speed V is positive, the control proceeds to Step 30.

In Step 30, the vehicle body speeds $V_j$ at the positions of the front wheels 12FL and 12FR and the rear wheels 12RL and 12RR are calculated based on the vehicle body speed V, the yaw rate γ of the vehicle 14 detected by the yaw rate sensor 44, and the like. Thus, this Step 30 functions as an apparatus configured to acquire information on the vehicle body speeds $V_j$ at the positions of the four wheels. Note that, the value of the vehicle body speed $V_j$ is positive when the vehicle 14 is traveling forward. Note that, reference should be made to, for example, Japanese Patent Application Laid-open No. 2002-211378 and Japanese Patent Application Laid-open No. Hei 9-86367 as necessary for the calculation of the vehicle body speeds at the wheel positions.

In Step 40, the vertical loads $Fz_j$ of the front wheels 12FL and 12FR and the rear wheels 12RL and 12RR are calculated based on a weight W of the vehicle 14, the longitudinal acceleration Gx and the lateral acceleration Gy of the vehicle 14, and the like. Thus, this Step 40 functions as an apparatus configured to acquire information on the vertical loads $Fz_j$ of the four wheels. Note that, the weight W of the vehicle 14 may be a constant value set in advance, or may be estimated, for example, when the vehicle starts to travel. Note that, reference should be made to, for example, Japanese Patent Application Laid-open No. 2008-179365 and Japanese Patent Application Laid-open No. 2006-192946 as necessary for the calculation of the vertical loads of the wheels.

In Step 50, the driving force Fx required by the driver is calculated based on the accelerator opening φ detected by the accelerator opening sensor 18 and the master cylinder pressure Pm detected by the pressure sensor 36. The pressing force on the brake pedal 30 and the stroke of the brake pedal 30 may be used instead of the master cylinder pressure Pm. Thus, this Step 50 functions as an apparatus configured to acquire information on the driving force Fx required by the driver. Note that, the required driving force Fx is positive when the force is a driving force and is negative when the force is a braking force.

In Step 60, the target driving forces $F_{xj}$ of the wheels 12FL to 12RR are calculated in accordance with Expression (17) corresponding to Expression (2) based on the vehicle body speeds $V_j$ at the positions of the wheels 12FL to 12RR, the vertical loads $F_{zj}$ of the wheels 12FL to 12RR, and the driving force Fx required by the driver.

$$\begin{bmatrix} F_{x1} \\ F_{x2} \\ F_{x3} \\ F_{x4} \end{bmatrix} = \frac{1}{\sum_{j=1}^{4} \frac{F_{zj}}{V_j}} \begin{bmatrix} \frac{F_{z1}}{V_1} \\ \frac{F_{z2}}{V_2} \\ \frac{F_{z3}}{V_3} \\ \frac{F_{z4}}{V_4} \end{bmatrix} F_x \quad (17)$$

In Step 70, outputs of the in-wheel motors 16FL to 16RR and braking forces of respective wheels are controlled such that the driving forces of the wheels 12FL to 12RR are equal to the corresponding target driving forces $F_{xj}$, respectively. Note that, when the target driving forces $F_{xj}$ each take a negative value to apply a braking force, the regenerative braking forces are generated by the in-wheel motors 16FL to 16RR in preference to the friction braking forces generated by the friction braking apparatus, and an insufficient braking force is compensated for by the friction braking forces.

As can be understood from the description above, when it is determined that the vehicle 14 is traveling in Step 20, in Steps 30 to 50, the vehicle body speeds $V_j$ at the positions of the four wheels, the vertical loads $Fz_j$ of the four wheels, and the driving force Fx required by the driver are calculated, respectively. In Step 60, the target driving forces $F_{xj}$ for the four wheels are calculated in accordance with Expression (17) based on the vehicle body speeds $V_j$, the vertical loads $F_{zj}$, and the driving force Fx required by the driver. Thus, the required driving force is distributed to the four wheels such that each of the target driving forces $F_{xj}$ for the four wheels is proportional to a "ratio $F_{zj}/V_j$ of the vertical load $F_{zj}$ of the corresponding wheel to the vehicle body speed $V_j$ at the position of the corresponding wheel" and the sum of the target driving forces $F_{xj}$ for the four wheels is equal to the required driving force Fx. Further, in Step 70, the driving forces of the four wheels are controlled to be equal to the corresponding target driving forces $F_{xj}$, respectively.

In the embodiment described above, the target driving forces $F_{xj}$ for the four wheels are calculated in accordance with Expression (17) corresponding to Expression (2). Thus, as described above, the target driving forces $F_{xj}$ for the four wheels are driving forces that set the tire sliding velocity vectors $V_{vj}$ of the four wheels to be the same as one another not only when the vehicle is traveling straight ahead at a constant speed and when the vehicle is making a turn steadily, but also when the vehicle is traveling with acceleration or deceleration, and still also when the difference in wheel speed is large between the left and right wheels due to a small turning radius. Thus, it is possible to minimize the sum J of energy consumed by the tire treads of the four wheels irrespective of the traveling state of the vehicle, to thereby be able to extend the cruising distance of the vehicle per battery charge.

Further, in the embodiment described above, the target driving forces $F_{xj}$ for the four wheels are not limited to the driving force in a narrow sense, but may be negative driving forces, namely, braking forces. Thus, it is possible to minimize the sum J of energy consumed by the tire treads of the four wheels even under a situation in which braking forces are applied to the four wheels and thus the vehicle is braked.

The specific embodiment of the present invention is described in detail above. However, the present invention is not limited to the embodiment described above. It is apparent for those skilled in the art that various other embodiments may be employed within the scope of the present invention.

For example, in the embodiment described above, the driving force Fx required by the driver and the target driving forces $F_{xj}$ may be driving forces in a narrow sense or may be braking forces. However, those required and target driving forces may be corrected to be one of the driving forces in a narrow sense and the braking forces. Further, in accordance with this, the driving force application apparatus may be configured to apply one of the driving forces in a narrow sense and the braking forces to the front wheels 12FL and 12FR and the rear wheels 12RL and 12RR independently of one another.

Further, in the embodiment described above, the in-wheel motors 16FL to 16RR are configured to apply driving forces to the front wheels 12FL and 12FR and the rear wheels 12RL and 12RR independently of one another. However, an apparatus for applying driving forces to the four wheels such as the electric motor may be mounted on the vehicle body, or the apparatus for applying driving forces to the four wheels may include a drive source common in the left and right wheels and an apparatus configured to distribute a driving force generated by the drive source to the left and right wheels at a variable distribution ratio.

What is claimed is:

1. A driving force control apparatus, which is to be applied to a four-wheel drive vehicle comprising front left and right wheels and rear left and right wheels each having a tire and comprising a driving force application apparatus configured to apply driving forces to the four wheels independently of one another, and which is configured to control the driving forces to be applied to the four wheels by controlling the driving force application apparatus, the driving force control apparatus comprising:
   an apparatus configured to acquire information on vehicle body speeds at positions of the four wheels;
   an apparatus configured to acquire information on vertical loads of the four wheels; and
   an apparatus configured to acquire information on a driving force required by a driver to the four-wheel drive vehicle,
   wherein the driving force control apparatus is configured to calculate target driving forces for the four wheels required to set tire sliding vectors of the four wheels to be the same as one another based on the vehicle body speeds at the positions of the four wheels, the vertical loads of the four wheels, and the driving force required by the driver, and to control the driving force application apparatus such that the driving forces of the four wheels are equal to the corresponding target driving forces, respectively.

2. A driving force control apparatus according to claim 1, wherein the driving force control apparatus is configured to calculate the target driving forces for the four wheels by distributing the driving force required by the driver to the four wheels such that each of the target driving forces for the four wheels is proportional to a ratio of a vertical load of a corresponding wheel to a vehicle body speed at a position of the corresponding wheel and a sum of the target driving forces for the four wheels is equal to the driving force required by the driver.

3. A driving force control apparatus according to claim 1, wherein the driving force control apparatus is configured to calculate the target driving forces $F_{x1}$, $F_{x2}$, $F_{x3}$, and $F_{x4}$ for the front left and right wheels and the rear left and right wheels in accordance with the following expression:

$$\begin{bmatrix} F_{x1} \\ F_{x2} \\ F_{x3} \\ F_{x4} \end{bmatrix} = \frac{1}{\sum_{j=1}^{4} \frac{F_{zj}}{V_j}} \begin{bmatrix} \frac{F_{z1}}{V_1} \\ \frac{F_{z2}}{V_2} \\ \frac{F_{z3}}{V_3} \\ \frac{F_{z4}}{V_4} \end{bmatrix} F_x$$

where $V_1$ to $V_4$ represent the vehicle body speeds at the positions of the front left and right wheels and the rear left and right wheels, respectively, $F_{z1}$ to $F_{z4}$ represent the vertical loads of the front left and right wheels and the rear left and right wheels, respectively, and Fx represents the required driving force.

* * * * *